United States Patent [19]

McCormick

[11] Patent Number: 5,255,892
[45] Date of Patent: Oct. 26, 1993

[54] PLURAL COMPONENT AIR OPERATED SNUFF-BACK DISPENSE VALVE

[75] Inventor: Martin P. McCormick, Forest Lake, Ill.

[73] Assignee: Graco Inc., Minneapolis, Minn.

[21] Appl. No.: 876,179

[22] Filed: Apr. 30, 1992

[51] Int. Cl.⁵ .................................... F16K 23/00
[52] U.S. Cl. ................................ 251/321; 222/571
[58] Field of Search .................. 251/321, 318, 319; 222/571

[56] References Cited

U.S. PATENT DOCUMENTS

| | | | |
|---|---|---|---|
| 1,565,686 | 12/1925 | Titus. | |
| 2,721,008 | 10/1955 | Morgan, Jr. | 222/334 |
| 2,839,226 | 6/1958 | Ross | 222/446 |
| 3,806,084 | 4/1974 | Seese | 251/63 |
| 3,895,748 | 7/1975 | Klingenberg | 222/571 |
| 4,083,474 | 4/1978 | Waite et al. | 222/145 |
| 4,142,707 | 3/1979 | Bjorklund | 222/571 X |
| 4,394,945 | 7/1983 | Taylor, Jr. | 222/571 |
| 4,516,702 | 5/1985 | Schmidt | 222/514 |
| 5,065,910 | 11/1991 | Fiedler | 222/571 X |

Primary Examiner—Martin P. Schwadron
Assistant Examiner—Kevin L. Lee
Attorney, Agent, or Firm—Douglas B. Farrow

[57] ABSTRACT

A hardened needle and seat are provided in a dispense valve wherein the seat is spring loaded such that when the needle is pulled back against the seat, the seat moves away from the dispense opening causing a "snuff back" effect. Hardened seats and needles are utilized to provide long life and one or more components may be run using the same general valve mechanism at predetermined ratios.

3 Claims, 1 Drawing Sheet

PLURAL COMPONENT AIR OPERATED SNUFF-BACK DISPENSE VALVE

BACKGROUND OF THE INVENTION

In applying single or plural component sealants or adhesives on an assembly line or via a robot, remotely operated valves (pneumatic or electric) with a fluid "snuff-back" feature are often utilized. The snuff-back feature reverses the fluid flow at the nozzle slightly when the valve is closed to prevent dripping or stringing of the fluid being dispensed.

Commercially available snuff-back valves utilize a spool-type valve which runs in and out of a plastic "u" cup seal. In such a design, the shaft of the spool leaves and re-enters the seal in every valve cycle causing the seal to wear very quickly.

SUMMARY OF THE INVENTION

It is therefore an object of this invention to provide a snuff-back valve which provides an effective snuff-back feature and yet which may be easily and inexpensively manufactured and which is capable of obtaining extended service life.

Toward that end, the design of the instant invention uses hardened alloys and/or carbide needles and seats much like conventional (non-snuff-back) dispense valves. The snuff-back feature is attained by making the seat movable. When the needle is pulled back into the seat, the fluid is shut off at the time of contact. As the needle continues to be pulled back further, the seat is pulled back with it and fluid is pulled back from the nozzle and outlet passage. The amount of travel (volume of the snuff-back) is controlled by an adjustment on the driver mechanism.

Because the needle and seat are made of very hard materials, they will stand up to high cycle rates even with abrasive fluids. The seat in turn is sealed to a housing with a conventional O-ring which stays in constant compression and experiences very little wear. The area of the needle and seat is equal to the area of the driver shaft so that the fluid trapped behind the seat can move toward the driver with the seat and not be compressed or pushed back out of the valve.

The advantage of the instant design is that it provides a very high cycle life. It also provides, as mentioned above, equal displacement so that fluid is not pushed upstream out of the valve against a pump or check valve. The instant invention also provides adjustable needles so that valve timing and offset can be adjusted for different viscosities and/or volume ratios and also provides changeable needles.

Different thickness needles can be used to compensate for different viscosities and/or volume mix ratios. The nozzle sizing can be varied such that by changing the nose piece different size nozzles may be used to compensate for differing viscosities and/or mixed ratios.

These and other objects and advantages of the invention will appear more fully from the following description made in conjuction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
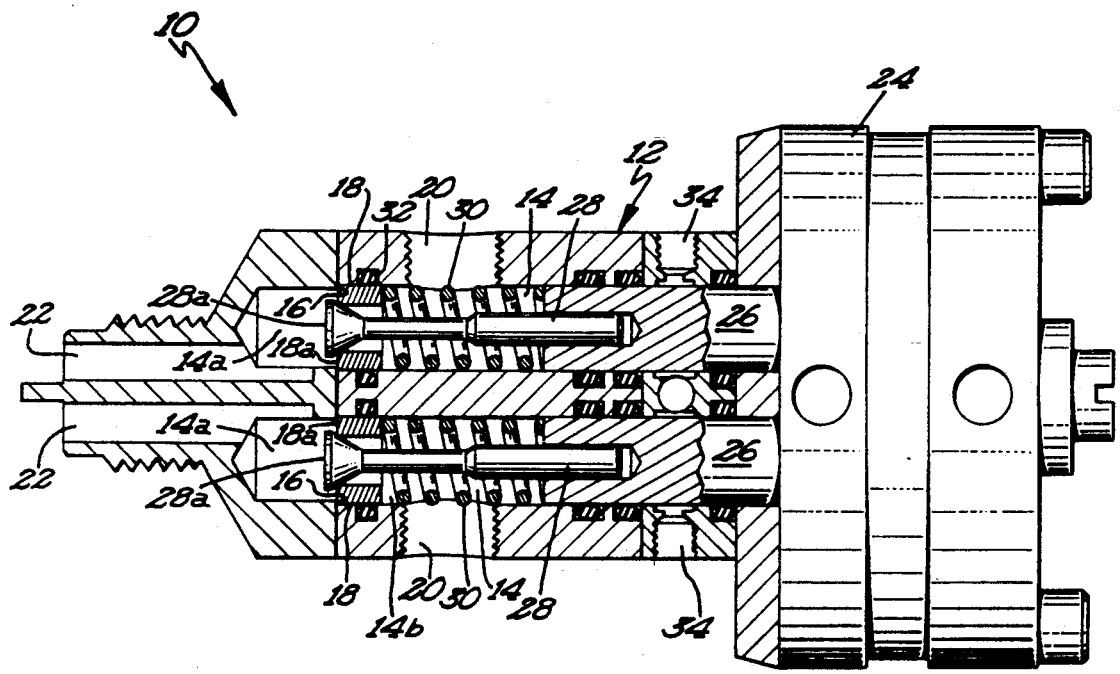
FIG. 1 is a side cross-sectional view showing the device of the instant invention.
Figure 2:
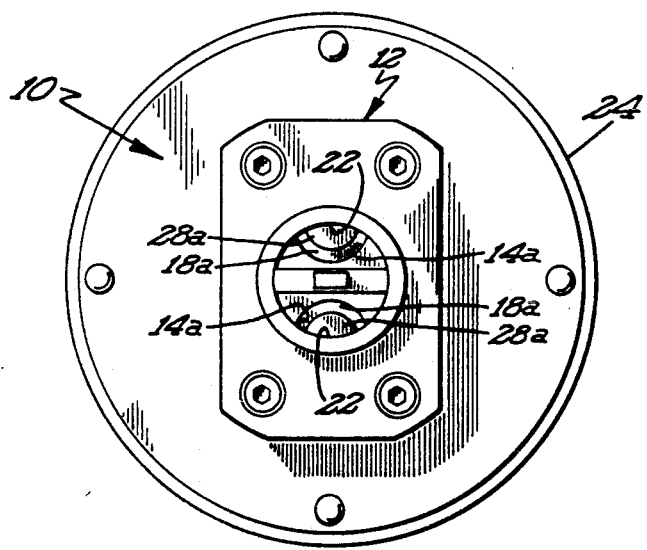
FIG. 2 shows a detail of the seat and the step.

The device of the instant invention as shown in FIG. 1 is generally designated 10 and is shown for use with a two component material designed to be mixed with a 1:1 ratio. It is of course understood that the design of the instant invention can be adopted for different numbers of components (single or more than two) and may also be adopted to mix different ratios by appropriate sizing of needles, seats and driver shafts and the like.

The valve 10 of the instant invention is generally comprised of a housing 12 comprising two longitudinal passages 14 therein each passage 14 comprising a first portion 14a and a second portion 14b, the two portions being separated by a step 16 against which first end 18a of annular seat 18 seats. Annular seat 18 is slideably located in the second portion of 14b of passage 14 and is confined at one end by step 16.

Intake ports 20 are provided into passage 14 for provision of material and an outlet passage 22 is connected to first portion 14a of passage 14 for dispensing. A double acting air cylinder assembly 24 has connected thereto driver shafts 26. Driver shaft 26 has affixed thereto a needle 28 which has an end 28a which seats against first end 18a of seat 18.

A spring 30 biases seat 18 away from driver shaft 26. An O-ring 32 provides sealing between seat 18 and housing 12 while lube input port 34 provides lubrication for driver shaft 26.

In operation, air cylinder 24 moves driver shaft 2 and needle 28 to a first position to the left of that shown in FIG. 1 whereby fluid is allowed to pass through port 20 and into outlet passage 22 by passing between seat 18 and needle 28.

When it is desired to stop the flow of fluid, air cylinder 24 moves driver shaft 26 and needle 28 to the right in FIG. 1 thereby causing needle 28 to seat against seat 18 and push seat 18 away from step 16 thereby increasing the effective volume of outlet passage 22 and causing the snuff-back effect. Because the diameters of driver shaft 26 and seat 28 are approximately equal, such rearward displacement does not cause any back flow of fluid out of inlet port 20.

It is contemplated that various changes and modifications may be made to the snuff-back dispense valve without departing from the spirit and scope of the invention as defined by the following claims.

What is claimed is:

1. A snuff-back dispense valve comprising:
a housing:
at least one longitudinal passage in said housing, said passage comprising:
first and second ends;
an inlet intermediate said first and second ends;
an outlet adjacent said first end; and
a step separating a reduced diameter first portion of said passage adjacent said passage first end and a larger diameter second portion of said passage extending toward said passage second end; and
at least one driver shaft having a shaft end, said shaft end extending into said passage from said passage second end;
an annular seat having first and second sides and slideably located in said passage second portion to seat against said step;

a spring located between said seat and said shaft end to bias said seat and said shaft end apart and said seat against said step; and a needle connected to said driver shaft, said needle extending through said seat, said seat first side facing said passage first end and said needle removably seating against said seat first side.

2. The snuff-back dispense valve of claim 1 wherein said driver shaft is movable between first and second positions whereby in said first position, said driver shaft extends into said passage sufficiently to unseat said needle from said seat and allow flow therebetween and whereby in said second position, said driver shaft retracts from said passage sufficiently to seat said needle against said seat and move said seat away from said step to produce a snuff-back.

3. The snuff-back dispense valve of claim 2 wherein said driver shaft and said seat comprise approximately equal diameters.

* * * * *